Feb. 4, 1969

R. S. SHELTON 3,425,284

LINEAR ACTUATOR

Filed June 29, 1967

*INVENTOR.*
RUSSELL S. SHELTON
BY
Browne, Schuyler & Beveridge

ATTORNEYS

Feb. 4, 1969 R. S. SHELTON 3,425,284
LINEAR ACTUATOR
Filed June 29, 1967 Sheet 2 of 4

INVENTOR.
RUSSELL S. SHELTON
BY
Browne, Schuyler & Beveridge
ATTORNEYS

INVENTOR
RUSSELL S. SHELTON

BY Browne, Schuyler & Beveridge
ATTORNEYS

Feb. 4, 1969   R. S. SHELTON   3,425,284
LINEAR ACTUATOR
Filed June 29, 1967   Sheet 4 of 4
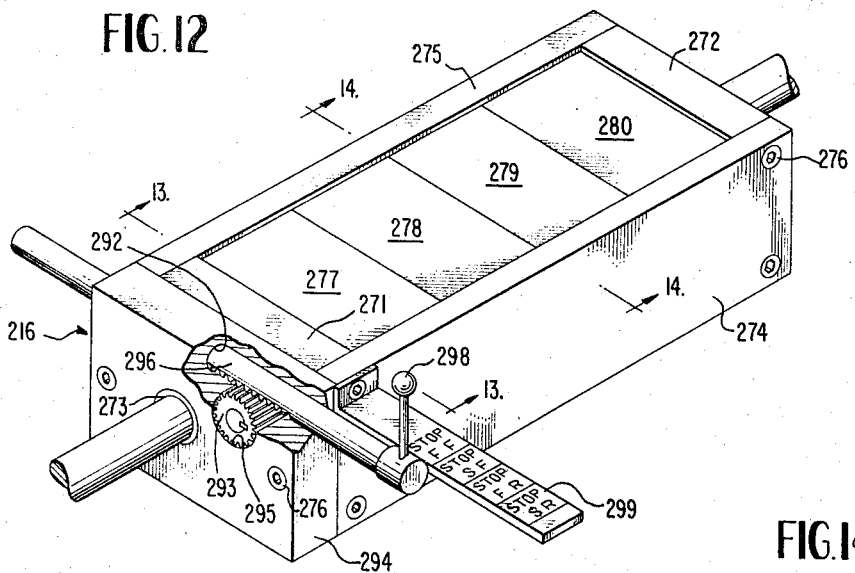
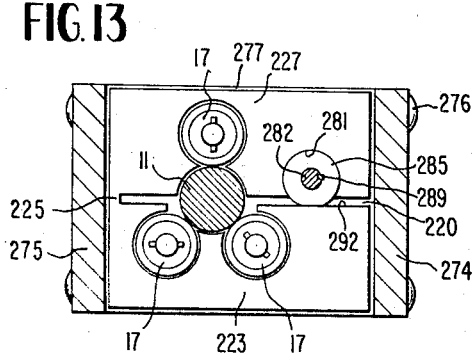
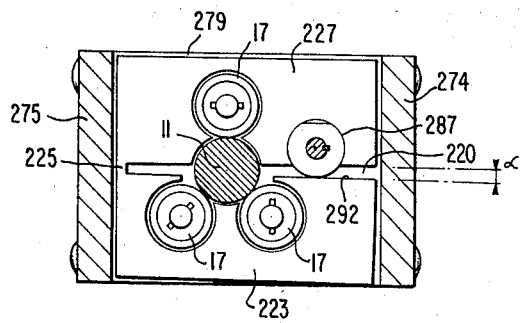
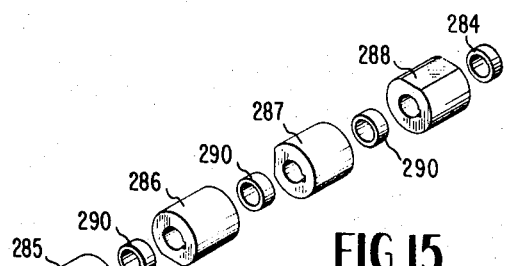
INVENTOR
RUSSELL S. SHELTON
BY *Brown, Schuyler & Beveridge*
ATTORNEYS

United States Patent Office 3,425,284
Patented Feb. 4, 1969

3,425,284
LINEAR ACTUATOR
Russell S. Shelton, Paducah, Ky., assignor to Crounse Corporation, Paducah, Ky., a corporation of Kentucky
Continuation-in-part of application Ser. No. 577,934, Sept. 8, 1966. This application June 29, 1967, Ser. No. 655,985
U.S. Cl. 74—25                          21 Claims
Int. Cl. F16h 21/16

ABSTRACT OF THE DISCLOSURE

A linear actuator for converting rotary motion to linear motion, including an elongated rotary shaft and a roller block supported for linear movement along the axis of the shaft. The roller block includes a base and a spring block supported for relative pivotal movement and actuator means operable to selectively vary the degree of frictional contact between the rollers and the shaft.

---

This is a continuation-in-part of my co-pending application Ser. No. 577,934, filed Sept. 8, 1966, now abandoned.

This invention relates to motion translation mechanisms for converting rotary motion into linear motion, and more particularly to an improved multiple speed reversible thrust motor translation mechanism for converting rotary motion into linear motion.

Motion translation mechanisms, hereinafter sometimes referred to as linear actuators, or actuators, of this general type are well-known and conventionally employ a cylindrical shaft mounted for rotation about its longitudinal axis and a rider or roller block supported for linear movement along the axis of the shaft by a plurality of rollers mounted on the rider and engaging the outer surface of the shaft. The axes of rotation of the rollers are disposed at an angle relative to the longitudinal axis of the drive shaft, and the surface of the rollers is resiliently urged into frictional engagement with the surface of the shaft so that, as the shaft turns, the rollers describe a helical path around the shaft to move the rider linearly along the axis of the shaft. For a given shaft size and speed of rotation, the rate of travel of the rider along the shaft is determined by the angle which the roller axes make with the shaft axis. Also, the thrust which the roller block is capable of exerting is governed by this angle between the roller axes and shaft axis, hereinafter sometimes referred to as the lead angle, and by the pressure exerted between the rollers and the shaft.

It is also known to provide linear actuators of this general type in which the lead angle of the rollers can be varied to vary the rate of travel for a given actuator. For example, in one such device, illustrated in United States Patent, 152,518, the lead angle of the individual rollers can be adjusted to any desired angle and fixed in place to provide the actuator with the desired rate of travel. To change the rate of travel of such an actuator, it was necessary to readjust the lead angle of the individual rollers.

It has also been known to provide mechanisms for automatically adjusting the lead angle between predetermined limits to provide an infinitely variable rate of travel between the predetermined limits. However, such actuators require complicated mechanisms for varying the lead angle, and it has not been possible to accurately repeat a lead angle setting between the predetermined limits.

Similar difficulties have been encountered in varying the thrust produced by the prior art acuators, and it has been known to vary the diameter of the drive shaft at various positions along its length to automatically increase or decrease the pressure between the rollers and the shaft at the various axial positions. However, most actuators have merely provided means for adjusting the force between the rollers and shaft to the desired level, and to provide resilient means such as a spring to absorb any slight variations which might be encountered during operation of the device.

With the foregoing in view, the primary object of the present invention is to provide an improved variable thrust linear actuator.

Another object is to provide an improved multiple speed linear actuator.

Another object is to provide an improved multiple speed, variable thrust linear actuator.

Another object is to provide an improved linear actuator including a rider assembly which is capable of moving in either direction along the shaft upon rotation of the shaft in a single direction.

Anoher object of the invention is to provide an improved multiple speed variable thrust linear actuator which is operable in either direction along a drive shaft upon rotation of the shaft in a single direction.

The foregoing and other objects are attained in a linear actuator according to this invention in which the rider assembly includes a roller block formed in two sections, one disposed on each side of the cylindrical drive shaft, with the two sections of the roller block secured together at one side by a solid, resilient hinge. A set of angled rollers having a fixed lead angle are mounted on the roller block in position to clampingly engage the drive shaft. Suitable actuator means, such as a fluid motor, is provided for urging the set of rollers into clamping engagement with the drive shaft against the resilient force of the solid hinge. To vary the thrust of the actuator, it is only necessary to vary the clamping force exerted on the angled rollers by the fluid motor.

Preferably, the rider assembly includes a plurality of roller blocks with the set of angled rollers of each block having a different lead angle. The actuator means for the separate roller blocks are selectively operable so that, depending upon the lead angle of the set of rollers which are actuated at the time, the rider may be driven axially along the drive shaft at the rate and in the direction desired.

Other objects and advantages of the invention will become apparent from the following detailed description taken with the drawings, in which:

FIG. 12 is a perspective view, similar to FIGS. 1 and 9, showing a further embodiment of the invention, with a portion broken away to more clearly show other parts of the device;

FIG. 13 is a sectional view taken on line 13—13 of FIG. 12;

FIG. 14 is a sectional view taken on line 14—14 of FIG. 12; and

FIG. 15 is an exploded view, in perspective, of a portion of the actuator shown in FIG. 12.

Figure 1:
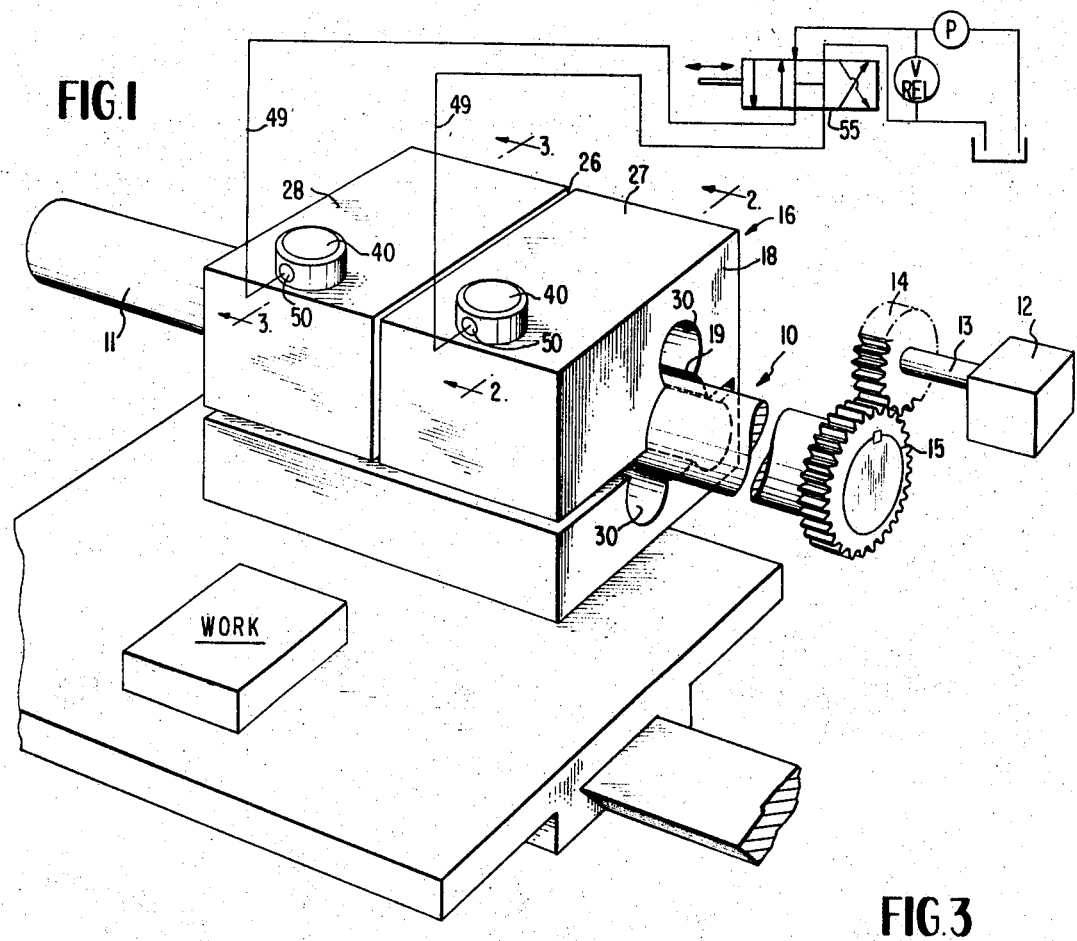
FIG. 1 is a perspective view of an actuator according to the present invention, with the actuator fluid control system illustrated in schematic.

Referring now to the drawings in detail, an actuator according to the present invention is illustrated in FIG. 1 by the reference numeral 10 and includes an elongated cylindrical drive shaft 11 which is supported by suitable bearings, not shown, for rotation about its longitudinal axis by any suitable drive means such as the motor 12 acting through shaft 13, and gears 14 and 15. A rider assembly 16 is supported for linear movement along the axis of shaft 11 by a plurality of rollers 17 in a manner more fully described hereinbelow. The rider 16 includes a roller support block 18 having a bore 19 of a diameter sufficient to loosely receive shaft 11 extending therethrough. A traverse slot 20 extends from one vertical face 21 of block 18 through bore 19 and terminates adjacent the vertical face 22 to divide the block into a lower half or base 23 and an upper half 24, with the two halves joined along one edge by a solid hinge portion 25. A vertical slot 26 divides the top half 24 into separate spring blocks 27, 28, respectively with each being joined to the base 23 by spring hinge 25.

Three bores 30 extend into each end of block 18, with the separate bores being equally spaced around and the peripheries thereof slightly overlapping bore 19. Two of each set of three bores are formed in base 23 and one bore is formed in each of the sections 27 and 28. The axis of each bore 30 is disposed at an angle with respect to, and is contained in a plane parallel to the axis of shaft 11. A set of three rollers 17 are mounted for rotation on fixed shafts 31 mounted one within each of the respective bores 30, with the axes of the shafts 31 being parallel to the corresponding bores 30. The angle which the shafts 31 of each set of rollers makes with the axis of shaft 11 are all equal but the lead angle of the different sets of rollers may differ as illustrated in FIGS. 2 and 3 or in FIGS. 5–8.

Figure 2:
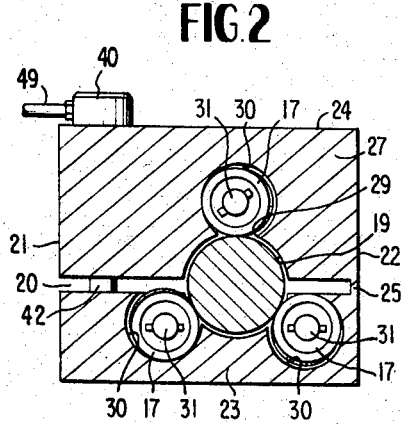
FIG. 2 is a sectional view taken on line 2—2 of FIG. 1.
Figure 3:
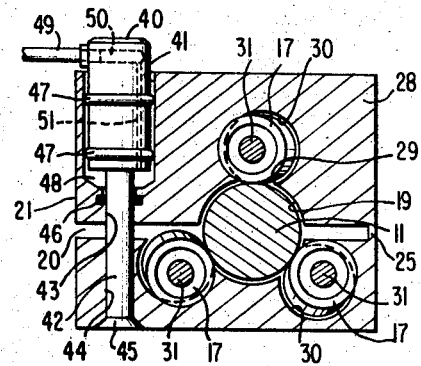
FIG. 3 is a sectional view taken on line 3—3 of FIG. 1.
Figure 4:
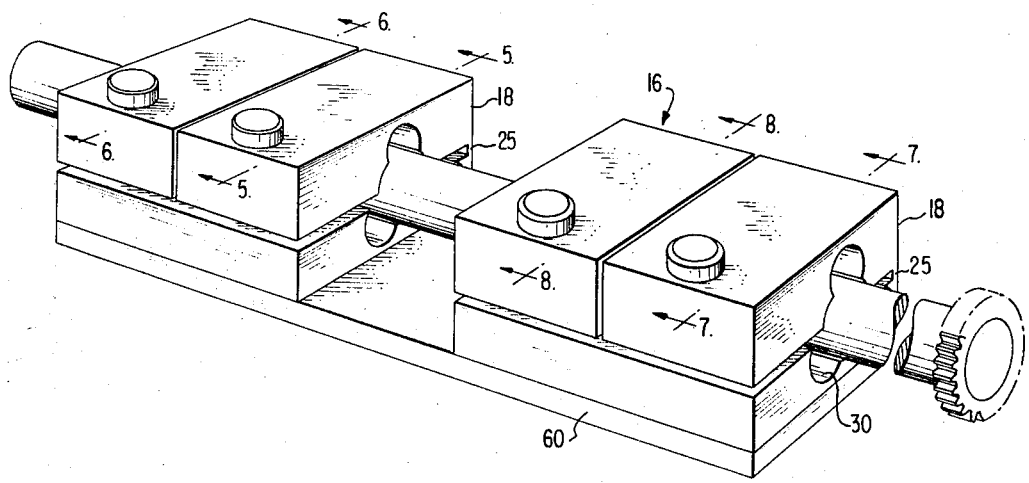
FIG. 4 is a perspective view similar to FIG. 1 and illustrating an alternate embodiment of the invention.
Figure 5:
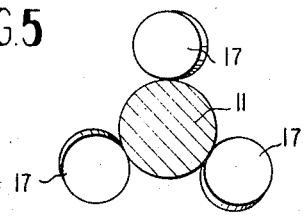
FIGS. 5 through 8 are similar fragmentary sectional views illustrating the lead angle of the various sets of rollers in the actuator illustrated in FIG. 4.
Figure 7:
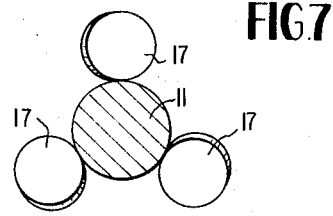
Figure 6:
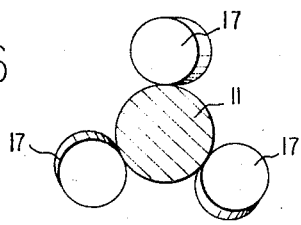
Figure 8:
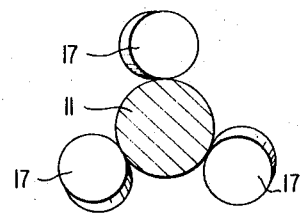

Referring to FIGS. 2 and 3, it is seen that the rollers 17 are positioned to contact the cylindrical surface of shaft 11 through the slot 29 formed at the overlapped portion of the bores 30 and 19. With the various elements of the rider 16 in its normal position, the solid spring hinge 25 maintains base 23 and spring blocks 27, 28 in spaced relation so that the frictional contact of rollers 17 with shaft 11 is very slight, and preferably only sufficient to maintain shaft 11 centered within bore 19.

The actuating mechanisms for increasing the frictional contact between the drive shaft and the rollers of the various sets of rollers are identical and accordingly only one will be described in detail and the same reference numerals will be applied to like parts of the actuating mechanisms. Referring to FIG. 3, a piston 40 is mounted within a counterbore 41 of spring block 28, and a piston rod 42 extends through bores 43 and 44 in the spring block and base respectively. Piston rod 42 terminates in an enlarged end 45 which prevents the piston rod 42 from being withdrawn through bore 44 in the direction of the piston. Suitable O-ring seals 46, 47 provide a fluid seal between piston rod 42 and spring block 28 and between piston 40 and spring block 28 to provide a fluid chamber 48 between piston 40 and the end of counterbore 41. Fluid under pressure may be directed to chamber 48 through fluid conduit 49 and drilled passages 50, 51 formed in piston 40. By applying fluid pressure within chamber 48, spring block 28 is forced in the direction of base 23 to force the rollers 17 into clamping engagement with shaft 11, the extent of the clamping engagement being determined by the pressure of the fluid within chamber 48. Preferably, the points of contact of the three rollers of each set lie in a plane containing the axis of piston 40 so that there is no tendency to twist the spring block with respect to the opposing base.

Referring to the embodiment of the invention illustrated in FIGS. 1–3, the set of rollers which includes the roller mounted within spring block 27 has a lead angle which is substantially less than the lead angle of the set containing the roller mounted in spring block 28. It is believed apparent that the greater lead angle will produce a correspondingly greater extent of travel of the rider mechanism 16 along shaft 11 for each revolution of the shaft 11. Therefore, by actuating valve 55 (FIG. 1) to direct fluid under pressure to the chamber 48 within spring block 27, and by actuating motor 12 to rotate shaft 11 about its longitudinal axis, the rider 16 will be driven axially along shaft 11 by the engagement of rollers 17 with shaft 11. By shifting valve 55 to direct fluid pressure to the chamber 48 within spring block 28, the increased lead angle of this set of rollers will drive the rider along shaft 11 at an increased rate.

Referring now to the embodiment of the invention illustrated in FIGS. 4–8, it is seen that the rider assembly 16 of the present invention may readily be adapted for both multiple speed and two directional linear movements along shaft 11 while the speed and direction of rotation of the shaft is maintained constant. This is accomplished by providing two roller support blocks 18, each fixedly secured on a mounting plate 60 in end-to-end relation, and each having two sets of rollers 17 mounted therein in the manner described above. The two sets of rollers in one of the support blocks 18, illustrated in FIGS. 5 and 6, have lead angles such that, upon rotation of shaft 11 in a clockwise direction as viewed from the end of the shaft having gear 15 mounted thereon, the rollers will inscribe a left hand helical path around the shaft to thereby move the rider assembly along the shaft in the direction away from gear 15. For convenience, this lead angle may be referred to as a negative lead angle. Conversely, the sets of rollers 17 contained in the other roller support block 18, illustrated in FIGS. 7 and 8, have a positive lead angle such as to inscribe a right hand helical path upon clockwise rotation of the shaft to thereby move the supports assembly toward gear 15. Thus, by rotating shaft 11 in one direction, and directing fluid under pressure to the appropriate fluid chamber 48 to thereby increase the frictional contact between that group of rollers and the shaft 11, the rider assembly 16 illustrated in FIG. 4 can be caused to move axially along the shaft in either direction at either a slow or fast rate.

While the spring blocks 27, 28 and base 23 are preferably formed from a single unitary metal block joined by integral spring hinges 25, these elements may be formed separately and subsequently joined by a separate hinge element. This latter arrangement may be desirable in certain installations to facilitate disassembly of the mechanism or to provide for adjusting the spacing of the spring blocks with relation to the base.

It is believed apparent that any desired number of roller support blocks 18 may be mounted on mounting plate 60, and that any desired combination of lead angles may be employed to produce the desired rate and direction of movement of the rider assembly. Further, it is believed apparent that the fluid pressure directed to the respective fluid chambers 48 may be varied to thereby vary the clamping force between the rollers 17 of any set of rollers to produce any desired thrust level for the actuator within the design limits of the mechanism.

When control valve 55 is in the null position illustrated in FIG. 1, the fluid pressure directed to the fluid chambers 48 is insufficient to overcome the resilient force of spring hinge 25 so that the frictional contact between the rollers 17 and the shaft surface is so slight (only sufficient to keep rider 16 centered on shaft 11) that any thrust produced by the rider assembly is negligible and the rider may easily be held stationary axially on shaft 11 while the shaft continues to rotate. Further, where the rider assembly includes groups of rollers having both positive and negative lead angles, the slight thrust produced by the opposing roller groups will add vectorially to zero, thereby eliminating any tendency for the rider assembly to "creep" or move axially along the shaft when the control valve is in the null position.

Figure 9:
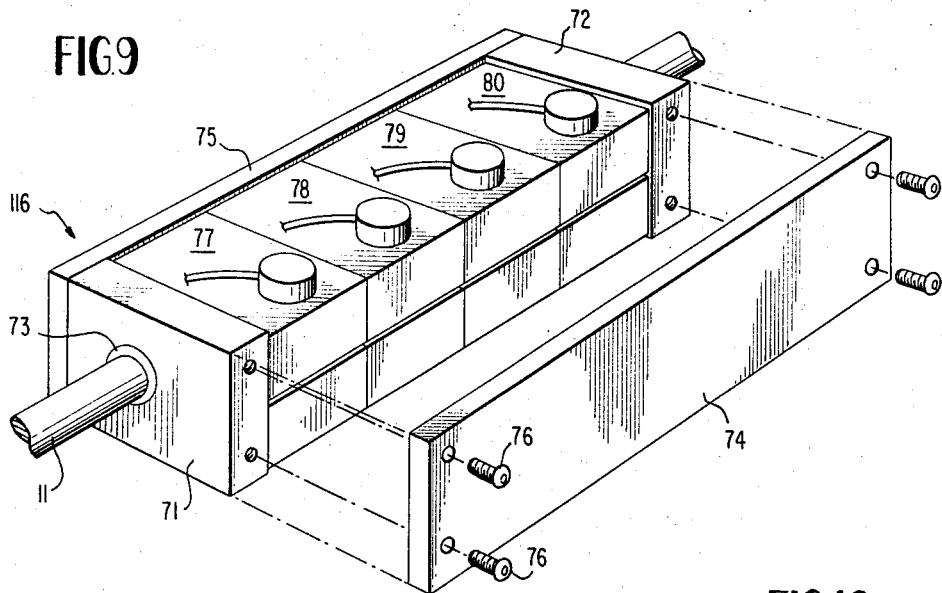
FIG. 9 is a perspective view of an alternate embodiment of the invention.
Figure 10:
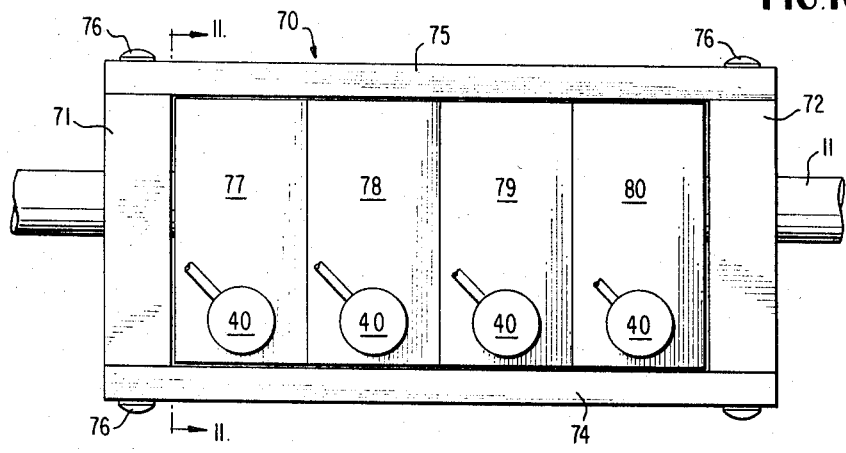
FIG. 10 is a top plan view of the actuator shown in FIG. 9.
Figure 11:
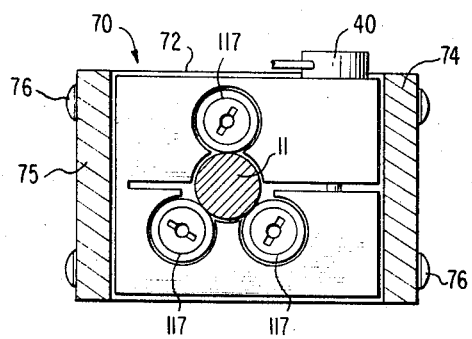
FIG. 11 is a sectional view taken on line 11—11 of FIG. 10.

Referring now to the embodiment of the invention shown in FIGS. 9 through 11, the rider assembly 116 comprises a rectangular frame 70 mounted for axial movement along shaft 11. The frame 70 includes a pair of spaced bearing blocks 71, 72 each supported for sliding movement along shaft 11 as by bushings 73. The bearing blocks 71, 72 are retained in spaced, parallel relation for simultaneous movement along shaft 11 by front and rear plates 74, 75, respectively, with plates 74, 75 being removably mounted on blocks 71, 72 by screws 76.

A plurality of individual roller blocks 77, 78, 79 and 80 are mounted on the shaft 11 between bearing blocks 71, 72 with each of the roller blocks being supported on shaft 11 by a set of angled rollers 17. The sets of rollers in the respective roller blocks 77, 78, 79 and 80 are each disposed of at different lead angles, and are actuated by fluid motors 40 in a manner described hereinabove with reference to FIGS. 4-8 of the drawings.

As is best seen in FIG. 10, the cumulative length of the bearing blocks 77, 78, 79 and 80 (along shaft 11) is substantially equal to but slightly less than the spacing of bearing blocks 71 and 72. Thus, actuation of the fluid motor 40 in either of the roller blocks to cause the block to move axially along shaft 11 will cause the entire assembly 116 to move substantially as a unit along the shaft.

Again referring to FIG. 10, the spacing between plates 74, 75 is substantially equal to and slightly greater than the transverse dimension of the roller blocks. Thus, the plates 74, 75 prevent substantial relative relational movement between the roller blocks and the frame.

In practice, the spacing between plates 74, 75 is maintained at a few thousandths of an inch greater than the transverse width of the roller blocks, and the spacing of the bearing blocks 71, 72 is a few thousandths of an inch greater than the cumulative length of the roller blocks. Thus, the individual roller blocks are afforded very limited relative movement with respect to one another to accommodate any misalignment between the respective blocks due to machine tolerances, or the like. At the same time, this relative movement is maintained at a minimum to eliminate or minimize lost motion in the rider assembly and to cause the rider to move substantially as a unit upon movement of any one of the roller blocks along the shaft.

Referring now to FIGS. 12 through 15 of the drawings, a further embodiment of the invention is illustrated as including a rider assembly 216 comprising a rectangular frame 270 mounted for axial movement along shaft 11. The frame 270 includes a pair of bearing blocks 271, 272, each supported for sliding movement along the shaft 11, as by bushings 273. The bearing blocks 271, 272 are retained in spaced, parallel relation for simultaneous movement along the shaft 11 by front and rear plates 274, 275, respectively, removably mounted on blocks 271, 272, by cap screws 276.

A plurality of individual roller blocks 277, 278, 279 and 280 are mounted on the shaft 11 between bearing blocks 271, 272. Each of the roller blocks are supported on shaft 11 by a set of angled rollers 17, with the sets of rollers in the respective roller blocks being disposed at different lead angles as described hereinabove. The construction of the rectangular frame 270, and the relative dimensions of the frame and roller blocks 277, 278, 279 and 280 are substantially the same as the corresponding parts of the embodiment of the invention illustrated in FIGS. 9 through 11. In this embodiment, however, each of the spring blocks have a bore 281 formed therein, with the axes of the bores 281 being parallel to the axis of shaft 11, and with the periphery of the bores 281 overlapping the transverse slot 220 in the bearing block. An elongated shaft 282 extends through the bores 281 and is journalled for rotation therein by bushings 283, 284 in openings (not shown) in bearing blocks 271, 272, respectively. Four cams 285, 286, 287 and 288 are mounted on the shaft 282 for rotation therewith, as by keys 289.

A plurality of spacers 290, telescopingly received on shaft 282, separate and space the cams so that cams 285, 286, 287 and 288, respectively, are disposed in the bores 281 of the spring blocks 277, 278, 279 and 280, respectively. Each of the cams have an outer cylindrical surface of a diameter substantially equally to the diameter of the bores 281, with a flattened surface formed on one side of the cams. As illustrated in FIG. 15, the respective cams are mounted with the flattened surface on adjacent cams being offset 90° with respect to one another, with this offset being in the same direction progressively from one end of the shaft.

The solid spring hinge portion 225 of the respective roller blocks 277-280 of this embodiment resiliently urge the angled rollers 17 into frictional engagement with the shaft 11. As illustrated in FIG. 13, when the flattened surface of the cam 285 is rotated to a position to contact the upper surface 292 of base 223, the resilient force of spring 225 will cause the rollers 17 to clamp the shaft 11 to move the rider assembly 216 along the shaft 11 in the manner described above. However, as illustrated in FIG. 14, when the cams are rotated to a position such that the flattened portion does not engage the surface 292, the base 223 and spring block 224 will be cammed apart against the resilient force of the spring 225 to slightly open the slot 220 and releave the frictional contact between the rollers 17 and the shaft 11. Since the flattened portions of the respective cams are offset with circumferentially with respect to one another, it is only possible to have the rollers of one roller block clampingly engaging the shaft 11 at any one time. Preferably, the flattened portion of the respective cams constitute substantial less than one-fourth the outer periphery of the cam surface, making it necessary to disengage the rollers of one roller block before engaging the rollers of another roller block.

To rotate the shaft 282, a pinion 293 is fixed on the end of the shaft adjacent the bearing block 271. A support plate 294 is mounted on the end of the rider assembly 216, as by cap screws 276, with the pinion 293 projecting to a bore 295 in plate 294. A rack 296 is slidably supported within a transverse bore 297 in plate 294 with the gear teeth on the rack engaging the gear teeth on the pinion 293 so that sliding movement of the rack in bore 297 will result in rotation of pinion 293 and shaft 282. Suitable means, such as the manual lever 298, is provided for sliding the rack in the bore 297. A scale 299 mounted on the rider 216 adjacent the end of rack 296 provides a visual indication of the rotative position of the pinion 293 and shaft 282 thereby indicating the selected speed and direction of the rider assembly along shaft 11.

In operation, the resilient spring portion 225 of the respective spring blocks 277-280 continuously urge the rollers in a direction to frictionally engage the drive shaft 11. However, the cam actuating mechanism prevents the rollers of more than a single spring block from engaging the shaft at any one time. To change the speed and/or direction of the rider assembly along the drive shaft, it is only necessary to rotate the cam shaft 282 to actuate the proper spring block assembly. It is believed apparent that any suitable arrangement could be substituted for the manually operated rack and pinion illustrated for rotating the shaft. For example, fixed cam means may be mounted at predetermined positions along the length of the drive shaft to engage and move the rack to prevent overrunning or overspeeding of the assembly at particular positions along the length of the shaft.

While I have described preferred embodiments of my invention, I wish it understood that I do not intend to be restricted solely thereto, but that I do intend to cover all embodiments thereof which would be apparent to one skilled in the art and which come within the spirit and scope of my invention.

What is claimed:

1. In a motion translation mechanism having a shaft mounted for rotation about its longitudinal axis, a rider assembly mounted on said shaft for axial movement thereon, said rider assembly including a plurality of rollers mounted for rotation about their respective axes with their surface in frictional contact with said shaft, said roller axes being disposed at an acute lead angle with respect to said shaft axis and spaced circumferentially therearound, the improvement wherein said rider assembly comprises a roller block including a base and a spring block disposed on opposite sides of said shaft, means connecting said base and said spring block for limited pivotal movement toward and away from each other, said base and said spring block each having at least one of said rollers mounted thereon, and actuator means carried by said rider assembly and selectively operable to urge said base and said spring block for pivotal movement relative to each other to vary the frictional contact between said shaft and said rollers.

2. The motion translation mechanism according to claim 1 wherein said means connecting said base and said spring block comprises a solid spring hinge rigidly connected to said base and said spring block at one side thereof, said actuator means being operable to overcome the resilient force of said solid spring hinge to vary the frictional contact between said shaft and said rollers.

3. The motion translation mechanism defined in claim 1 wherein said means connecting said base and said spring block comprises spring means normally resiliently retaining said spring block and said base in spaced relation to maintain the frictional contact between said rollers and said shaft at a minimum.

4. The motion translation mechanism according to claim 3 wherein said base and said spring block are resiliently connected by an integrally formed solid spring hinge, said actuator means being operable to overcome the resilient force of said solid spring hinge to increase the frictional contact between said shaft and said rollers.

5. The motion translation mechanism according to claim 1 wherein said means for urging said spring block and said base for pivotal movement relative to one another includes a fluid cylinder and piston operatively connecting said spring block and said base, and valve means for directing fluid under pressure to said cylinder.

6. The motion translation mechanism according to claim 1 further comprising spring means resiliently urging said rollers into frictional contact with said shaft, said actuator means including cam means for overcoming the resilient force of said spring means to reduce the frictional contact between said rollers and said shaft.

7. The motion translation mechanism according to claim 1, wherein said rider assembly further comprises a frame slidably mounted on said shaft, and means on said frame engaging said roller block for movement thereby upon movement of said roller block along said shaft.

8. The motion translation mechanism according to claim 7, wherein said frame comprises a pair of bearing blocks slidably mounted on said shaft one on each side of and adjacent said roller block, and means rigidly connecting said bearing blocks for simultaneous movement along said shaft.

9. The motion translation mechanism according to claim 1, wherein said rider assembly further comprises a frame including a pair of bearing blocks slidably mounted on said shaft in fixed spaced relation to one another, and a plurality of said roller blocks independently mounted on said shaft between said bearing blocks so that movement of any one of said roller blocks axially along said shaft will result in substantially simultaneous movement of said frame and the remainder of such roller blocks along said shaft.

10. A motion translation mechanism comprising a shaft mounted for rotation about its longitudinal axis, a rider mounted on said shaft, roller means supporting said rider for axial movement along said shaft, said roller means including a first set of rollers mounted on said rider for rotation about their respective axes with their surface in frictional contact with said shaft, the axes of said first set of roller being disposed at an acute lead angle with respect to said shaft axis and spaced circumferentially therearound, a second set of rollers mounted on said rider for rotation about their respective axes with their surface in frictional contact with said shaft, the axes of said second set of roller being disposed at an acute lead angle with respect to said shaft axis and spaced circumferentially therearound, and actuator means carried by said rider assembly and selectively operable to vary the degree of frictional contact between each of said sets of rollers and said shaft.

11. The motion translation mechanism according to claim 10 wherein the lead angle of one of said sets of rollers is greater than the lead angle of the other of said sets of rollers.

12. The motion translation mechanism according to claim 10 wherein the lead angle of one of said sets of rollers is positive and the lead angle of the other of said sets of rollers is negative.

13. The motion translation mechanism according to claim 12 including at least two sets of rollers each having positive lead angles and at least two sets of rollers each having negative lead angles.

14. The motion translation mechanism according to claim 13 wherein said positive lead angles are unequal and wherein said negative lead angles are unequal.

15. The motion translation mechanism defined in claim 13 wherein the algebraic sum of said lead angles is approximately zero.

16. The motion translation mechanism according to claim 10 wherein said rider comprises a base and a pair of spring blocks, said base and said spring blocks being disposed on opposite sides of said shaft, and means connecting said base to said spring blocks for limited pivotal movement toward and away from each other, each of said spring blocks having at least one roller of a set of rollers mounted thereon with the remaining rollers of the respective sets being mounted on said base.

17. The motion translation mechanism according to claim 16 wherein said means connecting said base to said spring blocks comprises resilient spring means for urging said base and said spring blocks for rotation relative to one another, said actuator means being operable to overcome the resilient force of said spring means to vary the degree of frictional contact between said rollers and said shaft.

18. The motion translation mechanism according to claim 17 wherein said actuator means includes fluid cylinder and piston means operatively connecting said spring blocks and said base, and valve means for directing fluid under pressure to said cylinder and piston means.

19. The motion translation mechanism defined in claim 17 wherein said actuator means comprises cam means for pivotally moving said base with respect to said spring blocks against the resilient force of said spring means.

20. The motion translation mechanism according to claim 18 wherein said means connecting said base and said spring block comprises a solid spring hinge rigidly connected to said base and said spring block at one side thereof.

21. The motion translation mechanism according to claim 18 wherein said base and said spring block are resiliently connected by an integrally formed solid spring hinge.

References Cited

UNITED STATES PATENTS 2,940,322   6/1960   Uhing _____ 74—25
3,272,021   9/1966   Weber _____ 74—25

FRED C. MATTERN, JR., *Primary Examiner.*

WESLEY S. RATLIFF, *Assistant Examiner.*